(12) United States Patent
Nakagawa

(10) Patent No.: US 7,034,806 B2
(45) Date of Patent: Apr. 25, 2006

(54) VIRTUAL KEYBOARD

(75) Inventor: Katsuya Nakagawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 517 days.

(21) Appl. No.: 09/006,363

(22) Filed: Jan. 13, 1998

(65) Prior Publication Data

US 2001/0040554 A1    Nov. 15, 2001

(30) Foreign Application Priority Data

Feb. 20, 1997    (JP) .................................. 9-035919

(51) Int. Cl.
*G09G 5/00* (2006.01)
(52) U.S. Cl. ..................................... 345/168; 345/173
(58) Field of Classification Search ................ 345/168, 345/173–178; 341/22, 23, 26
See application file for complete search history.

(56) References Cited

U.S. PATENT DOCUMENTS

| | | | | |
|---|---|---|---|---|
| 4,914,624 A | * | 4/1990 | Dunthorn ..................... 364/900 |
| 5,392,035 A | * | 2/1995 | Yoshikawa ..................... 341/5 |
| 5,457,454 A | * | 10/1995 | Sugano ......................... 341/22 |
| 5,581,243 A | * | 12/1996 | Ouellette et al. ........... 345/173 |
| 5,581,484 A | * | 12/1996 | Prince ......................... 364/559 |
| 6,107,997 A | * | 8/2000 | Ure ............................. 345/173 |

* cited by examiner

Primary Examiner—Jimmy H. Nguyen
(74) Attorney, Agent, or Firm—David G. Conlin; William J. Daley, Jr.; Edwards, Angell, Palmer & Dodge, LLP

(57) ABSTRACT

The present invention provides virtual keyboard which can be used at the same number of operations as on a conventional keyboard and can allow a natural input operation at a minimized load. The virtual keyboard comprises a liquid crystal display for displaying thereon a keyboard having special keys and general keys, a transparent pressure-sensitive panel superimposed on the display and a computing portion that, when a special key and a general key on a pressure-sensitive panel are pushed at a time, detects the coordinate of a middle point between the two pushed positions from outputs of the pressure-sensitive panel, calculates a general key position from the special key point and the middle point and outputs a code corresponding to that position.

25 Claims, 6 Drawing Sheets

US 7,034,806 B2

VIRTUAL KEYBOARD

BACKGROUND OF THE INVENTION

The present invention relates to an input device and more particularly to a keyboard displayed on a display screen, which keyboard is hereinafter referred to as virtual keyboard.

On a conventional keyboard, one may input a capital character (alphabet) by pushing down on a Shift-key first and then keeping the shift key in the pushed state, pushing and releasing a desired character key. After this, one releases the shift key.

On the other hand, a virtual keyboard works for determining a character key of a keyboard presented on a display screen by comparing position information received from an output of a transparent pressure (touch)-sensitive panel disposed on the display screen with position information of keys of the keyboard presented on the display screen and outputting a character indicated on a corresponding character key.

Accordingly, on the virtual keyboard, any small character (alphabet) is input by pushing a corresponding key of the keyboard indicated on the display screen and any capital character is input in a shift mode, namely, by pushing a shift key first and a corresponding character key next. In practice of inputting a capital character (e.g., "I"), one must push and release the shift key to change over the input mode to Capital input mode, must push and release the key <I> to input the character "I" and, then, must push and release the shift key again to release the Capital input mode.

On the above-described virtual keyboard, however, the number of push-and-release operations is larger than by one on the conventional keyboard. This is inconvenient and unpleasant for those who have been familiar to the conventional keyboard.

SUMMARY OF THE INVENTION

Main object of the present invention is to provide a virtual keyboard which can be used like a conventional keyboard, allowing a user natural inputting operation with a reduced operation load.

A virtual keyboard according to the present invention is featured in that it is composed of a display means for displaying a keyboard, a transparent pressure(touch)-sensitive panel disposed on the display means and a processing means for receiving information of positions detected and sent in a time sequence from the pressure(touch)-sensitive panel when a combination of a general key and a special key in the keyboard is pushed at a time, identifying a position of the pushed general key according to the received position information and outputting a code corresponding to the pushed combination of the special key and the general key.

Another virtual keyboard according to the present invention has the same construction as the above-mentioned virtual keyboard and is further featured in that one of the received position information is a middle position between the pushed positions being selected as a furthest position from the special key in the information of positions detected in a time sequence and the position of the general key is determined by doubling a distance from the special key to the furthest position.

PREFERRED EMBODIMENTS OF THE INVENTION

Figure 1:
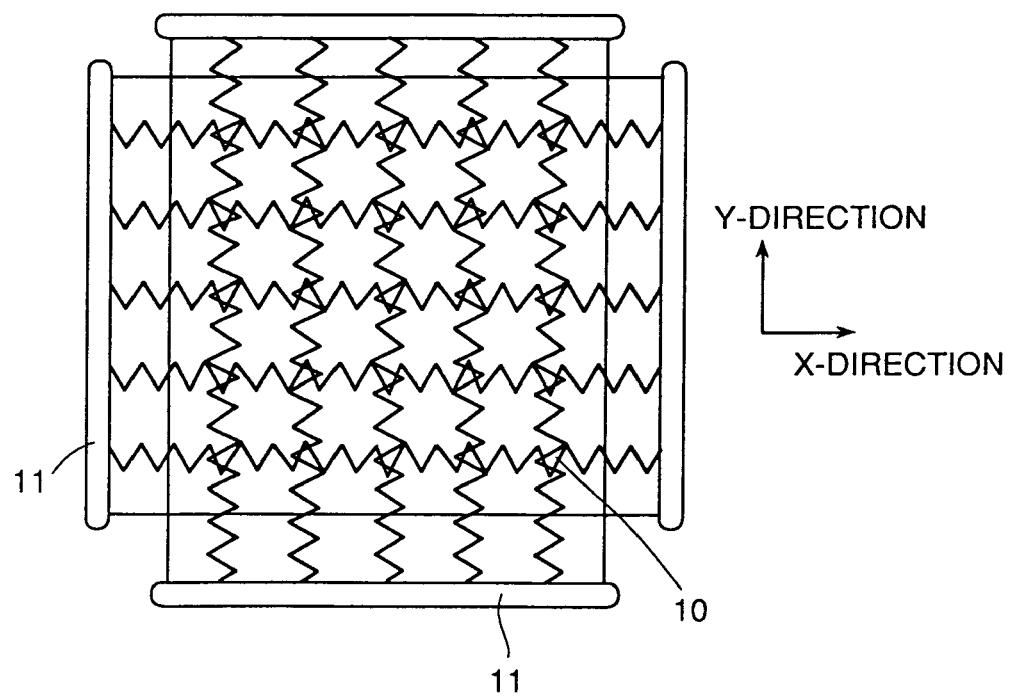
FIG. 1 shows a structure of a pressure-sensitive panel.

A pressure(touch)-sensitive panel used in a virtual keyboard of the present invention is similar in structure to a prior art pressure-sensitive panel and will be first and briefly described below:

FIG. 1 shows, by way of example, a film resistance type analog pressure-sensitive panel which comprises a large number, from several hundreds to several thousands, of transparent resistance wires 10 densely arranged along the X-axis and Y-axis thereof respectively and two pair of electrodes 11 for generating an output when any area of the pressure-sensitive touch panel is pushed down there on.

Figure 2A:
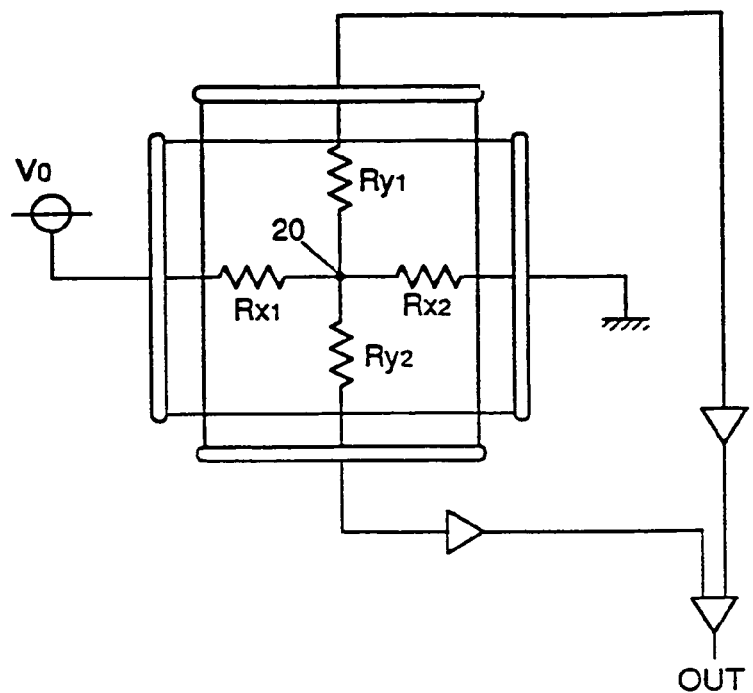
FIG. 2A shows an equivalent circuit for detecting a position in the X-axis direction when a push is made at one point on a pressure-sensitive panel.
Figure 2B:
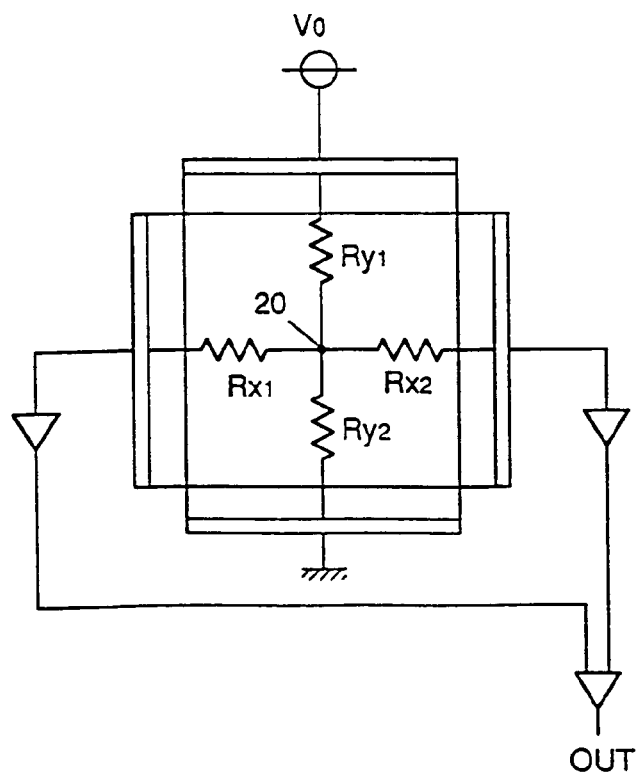
FIG. 2B shows an equivalent circuit for detecting a position in the Y-axis direction when a push is made at one point on a pressure-sensitive panel.

Referring to FIG. 2, the operation principle of the pressure-sensitive panel is described below:

When a pressure was applied to a point 20 on the pressure-sensitive panel, two resistance wires in the X-direction and Y-direction conduct at the point 20 as shown in FIG. 2A. At this time, a voltage V0 is applied across terminal electrode pair in the X-axis direction, so an output of V0vRX2/(RX1+RX2) is obtained across terminal electrode pair at both ends of the wire in the Y-axis direction. The output value corresponding to a divided resistance is amplified to determine a position of the point 20 in the X-axis direction. Similarly, a position of the point 20 in the Y-axis direction is determined by applying a voltage V0 across terminal electrode pair in the direction Y as shown in FIG. 2B. Usually, the pressure-sensitive panel conducts sampling of position values of a point pushed down on in the X-direction and Y-direction by momentarily changing the state of FIG. 2A to the state of FIG. 2B and reverse.

Figure 3:
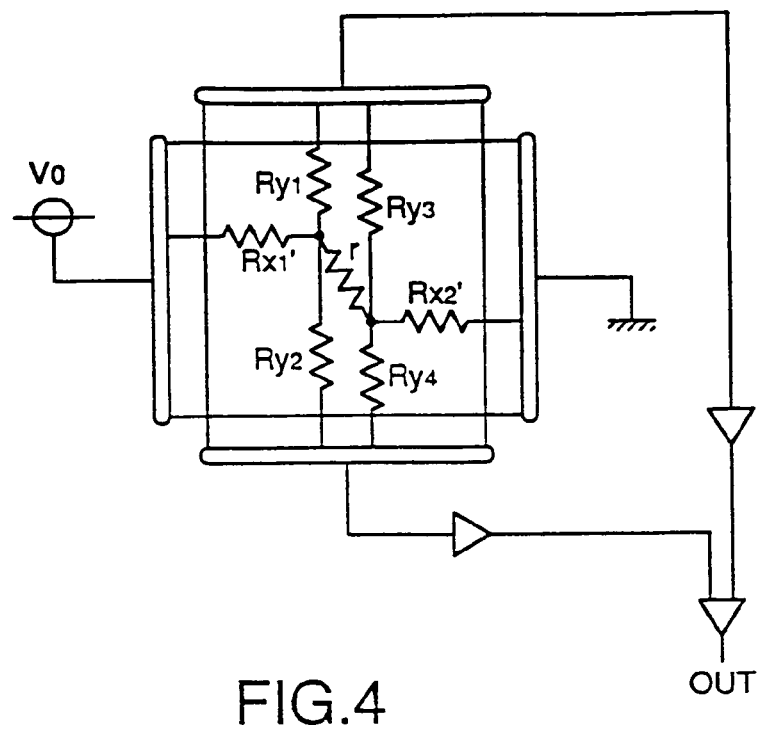
FIG. 3 shows an equivalent circuit for detecting a position in the X-axis direction when two points on a pressure-sensitive panel are pushed at a time.

FIG. 3 shows the pressure-sensitive panel when detecting positions of two points pushed down thereon in the X-axis direction. As shown in FIG. 3, a voltage obtained across electrodes in the Y-axis direction is an average output of two pushed points, which corresponds to a substantially middle position between the two pushed points in the X-axis direction. Similarly, an output corresponding to a substantially middle position between the two pushed points in the Y-axis direction can be obtained. The present invention is intended to enable a virtual keyboard to be operated easily like a conventional keyboard, utilizing the above-mentioned unique characteristic of the pressure-sensitive panel that outputs a substantially middle position between two points pushed down thereon.

Figure 4:
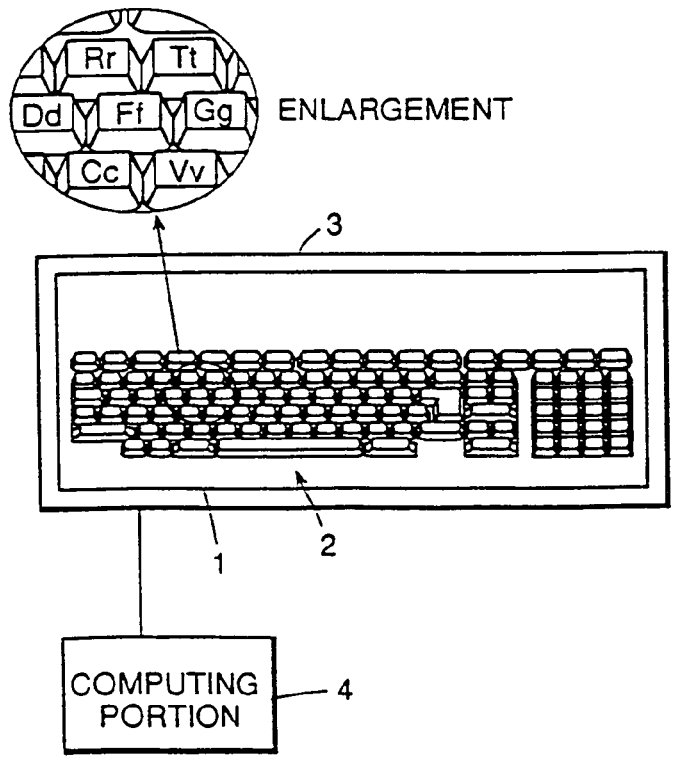
FIG. 4 shows a basic construction of an embodiment of the present invention.

FIG. 4 shows a basic construction of a virtual keyboard embodying the present invention. This embodiment comprises a liquid-crystal display (LCD) 1, a keyboard image 2 displayed on the liquid-crystal display 1, a transparent pressure-sensitive panel 3 superimposed on the liquid-crystal display 1 to detect which key position or combination of key positions of the keyboard image 2 are pushed, and a computing portion 4 for controlling the liquid-crystal display 1 connected thereto and the pressure-sensitive panel 3 connected thereto and determining, when two positions on the keyboard image 2 are pushed down on at the same time, and specifying the key to be output by performing calculating operations to be described later. The keyboard image 2 is identical to that of a conventional keyboard and has alphabetical character keys each of which carries thereon a small and a capital character as shown in an enlarged view in FIG. 4. The pressure-sensitive panel 3 is the before-described type pressure-sensitive panel.

The computing portion 4 holds coordinate areas corresponding to areas of respective keys of the keyboard image 2 in a coordinate system of the pressure-sensitive panel. Namely, the computing portion 4 has a memory (not shown) in which coordinate data of respective unit areas (keys of the keyboard image 2) in the coordinate pressure-sensitive panel and codes corresponding to said coordinate data. When any key of the keyboard image 2 was pushed, the computing portion 4 detects the pushed position by sampling outputs of the pressure-sensitive panel 3, identifies the pushed key by comparing the detected position with stored coordinate data and generates the corresponding code.

Figure 5:
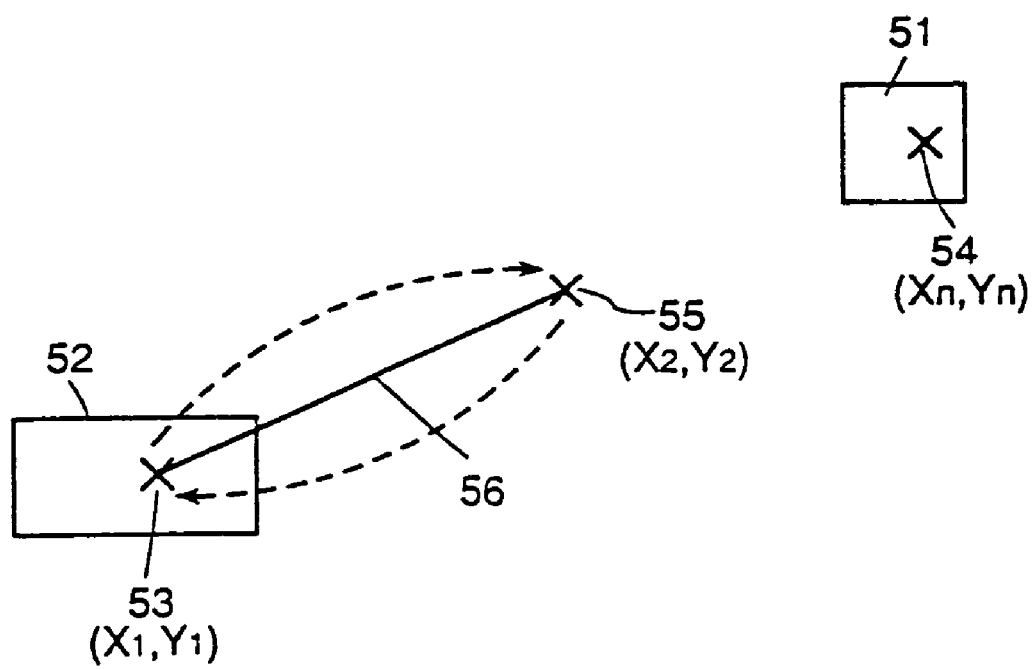
FIG. 5 is a view for explaining an input processing action of an embodiment of the present invention.

Referring to FIG. 5, the operation of a virtual keyboard according to the present invention will be described bellow:

In FIG. 5, there is shown ANK (alphabetical character and numeral etc.) key 51 of the keyboard image 2 that is hereinafter referred to as a general key. When any general key was pushed down on, the computing portion 4 conducts the above-mentioned operations and generates a corresponding code. In practice, a user can input, e.g., a small alphabetical letter "i" by pushing down on a general key 51 indicated with a letter "i". In this case, the small letter "i" is generated as far as the detected position lies within a coordinate area of the general key 51. This operation is the same as that of the conventional keyboard.

The operation of the virtual keyboard when detected that a general key and a special key (e.g., a shift-key, control-key or front-key) are pushed at a time is as follows:

When a user wants to input a capital alphabetical letter, e.g., "I", he or she pushes a special (<shift>) key 52 and pushes, keeping the shift key as pushed, a general (<I>) key 51 (the same key used for inputting a small letter "i"). In this instance, the computing portion 4 detects that two keys were pushed at a time, specifies the position of the pushed general key 51 by conducting processing operations (to be described later), judges that the capital letter "I" was input in this case, and generates a corresponding code. The computing portion 4, of course, has in its memory coordinate-data of areas of two simultaneously pushed keys and corresponding codes.

In this case, a user pushes a position 53 in a coordinate area of the special (<shift>) key 52 and, keeping the special key in the pushed state, pushes a position 54 in a coordinate area of the general character <i> key 51, then releases the push from the position 54 (general key 51) and the position 53 (special key 52). Output of the pressure-sensitive panel is sampled at a frequency of 100 to 200 times per second. Consequently, information of the detected positions represents a trace 56 which starts from a position 53, reaches a position 55 being a middle point between the start position 53 and the position 54 and returns therefrom to the start position 53. The position 53 is fixed by the coordinate (X1, Y1) and the position 55 is fixed by the coordinate (X2, Y2). The computing portion 4 detects these coordinates and calculates the coordinate (Xn, Yn) of the position 54 according to the following equations:

$Xn = 2X2 - X1$ $Yn = 2Y2 - Y1$

Namely, it is determined that the capital letter "I" was input, if the calculated coordinate (Xn, Yn) is within a coordinate area of a general key 51.

Thus, pushing a special key first and a general key next generates a trace of pushed positions, which starts from a coordinate area of the special key, turns at a certain point and terminates in the same coordinate area of the same special key. Consequently, the position of the general key pushed together with the special key can be determined by calculating a doubled vector from the start point to the turning point (a middle position between pushed positions). The inputting operation can be thus performed just like on the conventional keyboard. The display means may display character corresponding to a code generated.

Figure 6:
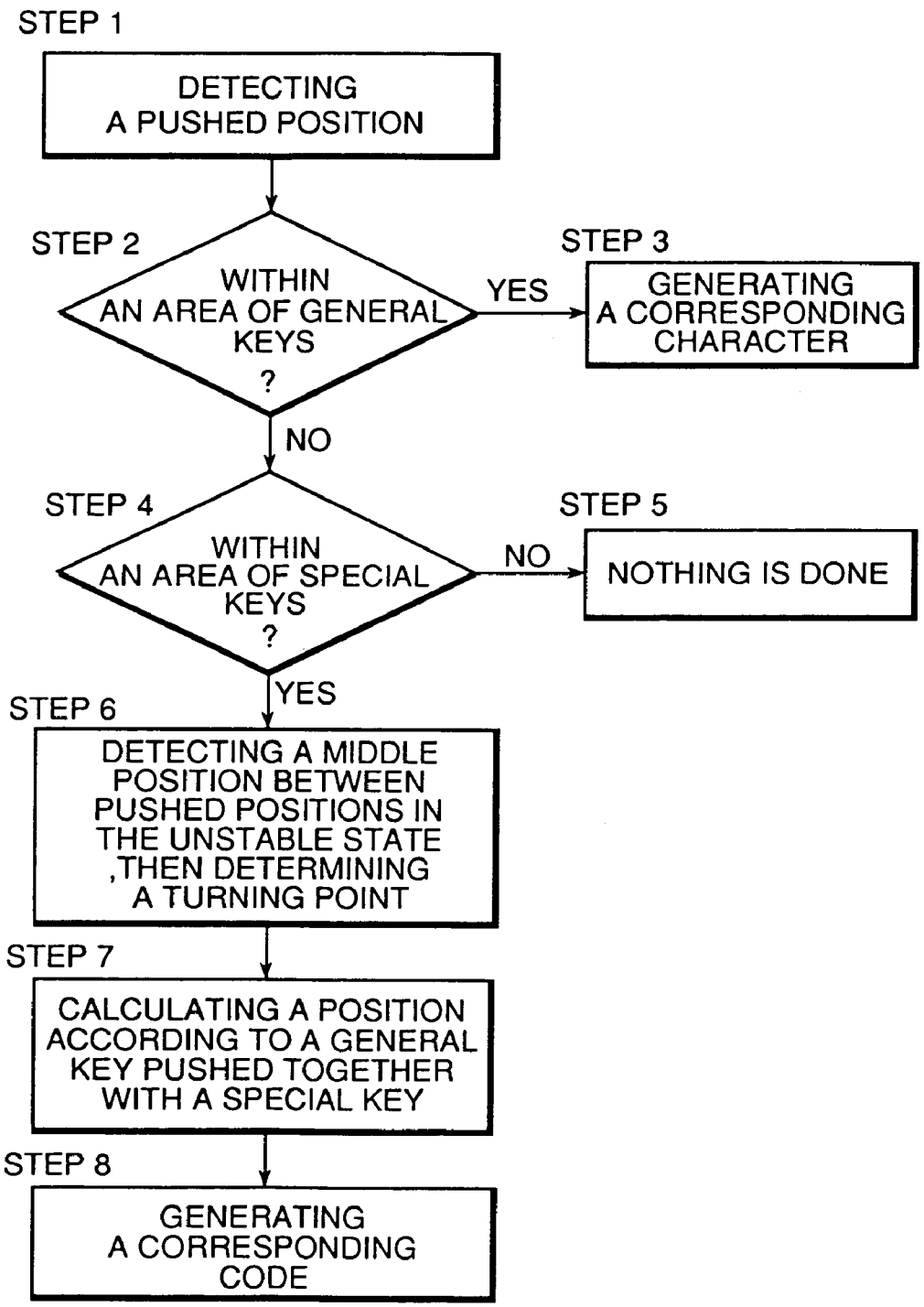
FIG. 6 is a flow chart depicting the operation of an embodiment of the present invention.

Referring to FIG. 6, the inputting operation of the virtual keyboard is described as follows:

A pushed position is detected first from the output of the pressure-sensitive panel (Step 1). Next, the detected position is judged whether it lies within an area of general keys. If so, a corresponding character is generated (Step 2 and 3).

The detected position being outside the area of general keys is further checked whether it lies within an area of special keys (Step 4). Nothing is done if the position is outside the area of the special keys (Step 5). If the detected position exists within the area of special keys, a trace of subsequently outputted position information (in the unstable state) is calculated and a turning point of the trace (a middle position between the pushed positions, in a sense) is determined (Step 6). In this embodiment, a furthest of subsequently detected points from the starting point is detected as the turning point.

A segment from the start point to the turning point is doubled to determine a corresponding position (Step 7) and a character code corresponding to the general key of the determined position is generated in the shift mode (capital input mode)(Step 8).

Figure 7:
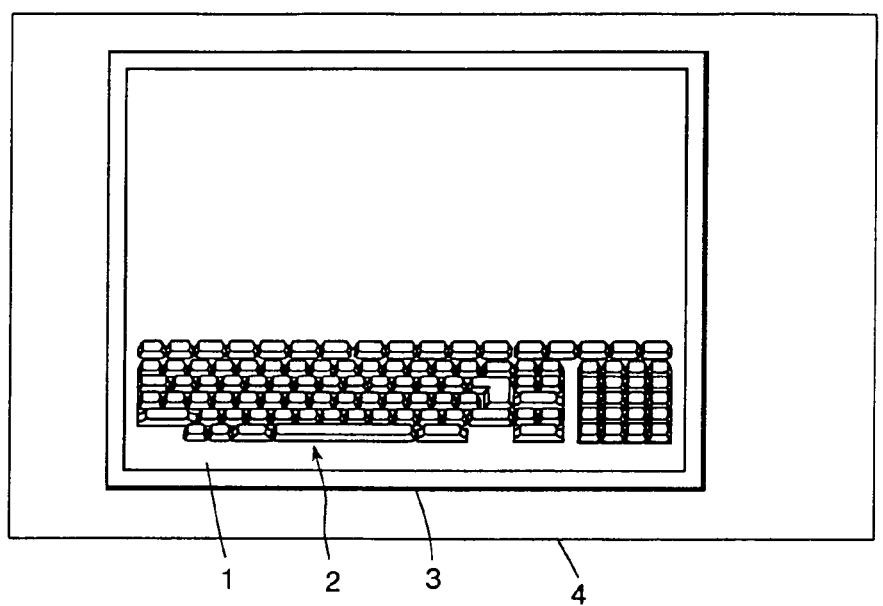
FIG. 7 is illustrative of an aspect of the present invention when it is applied to a portable type information terminal.

FIG. 7 shows another embodiment of the present invention, which is applied in a keyboardless portable type information terminal. A liquid-crystal display 1, a pressure-sensitive panel and a computing portion 4 are all built in a single solid body. This device is similar to the embodiment described with reference to FIG. 4, excepting that the liquid-crystal display 1 can display thereon characters input through a keyboard image 2 presented thereon.

Although the foregoing embodiments of the present invention have alphabetical keys, it is also possible to apply the present invention to a keyboard can generate plural kinds of characters from each of the general keys by using it in combination with a special key.

According to the present invention, it is possible to provide a virtual keyboard which can work just like a conventional keyboard, allowing a user to naturally conduct input operations with a minimized operation load.

The invention claimed is:

1. A virtual keyboard comprising:
a display for displaying a keyboard;
a transparent pressure-sensitive panel disposed on the display; and
a processor for receiving information of positions detected and sent in a time sequence from the pressure sensitive panel when a special key is first pushed and thereafter when both of the special key and a general key are pushed at the same time, identifying a position of the pushed general key according to the received position information and outputting a code corresponding to the combination of the pushed special key and the general key corresponding to the identified position.

2. A virtual keyboard as defined in claim 1, wherein one of the received position information, when both of the special key and the general key are pushed at the same time, is a furthest returning position from the special key and wherein the position of the general key is determined by doubling a distance between a start position and the furthest returning position.

3. A virtual keyboard as defined in claim 1, wherein a distance between a position of the first pushed key and a furthest returning position, when both of the special key and the general key are pushed at the same time, that are of the information of positions detected in a time sequence is doubled to identify the position of the general key.

4. The virtual keyboard of claim 1, wherein the transparent pressure-sensitive panel is of a type where a position in each of the x and y directions is determined using a divided resistance technique.

5. The virtual keyboard of claim 1, wherein the transparent pressure-sensitive panel includes:
a plurality of resistance wires being arranged to extend in a first direction;
a plurality of resistance wires being arranged to extend in a second direction, the first and second directions being at an angle with respect to each other; and
two pairs of electrodes where the plurality of resistance wires in the first direction extend between and are electrically coupled to one of the pair of electrodes and the plurality of resistance wires in the second direction extend between and are electrically coupled to the other of the pair of electrodes.

6. A virtual keyboard comprising:
a display that displays a keyboard;
a transparent pressure-sensitive panel disposed on the display; and
a processor that receives information of positions detected and sent in a time sequence from the pressure sensitive panel when a special key is first pushed and thereafter when both of the special key and a general key are pushed at the same time, that identifies the pushed general key by determining a position of the pushed general key according to the received position information of the first pushed key and the pushed combination of the special key and the general key and that outputs a code corresponding to the combination of the pushed special key and the identified general key.

7. A virtual keyboard as defined in claim 6, wherein:
one of the received position information, when both of the special key and the general key are pushed at the same time, is a furthest returning position from the special key in the information of positions detected in a time sequence, and
the position of the general key is determined by doubling a distance between a start position and the furthest position.

8. A virtual keyboard as defined in claim 6, wherein a distance between a position of the first pushed key and a furthest returning position, when both of the special key and the general key are pushed at the same time, that are of the information of positions detected in a time sequence is doubled to identify the position of the general key.

9. A virtual keyboard comprising:
a display for displaying a keyboard;
a transparent pressure-sensitive panel disposed on the display; and
a processor;
wherein the processor is configured and arranged:
(1) to receive information of positions detected and sent in a time sequence from the pressure sensitive panel, the position information provided including when a special key is first pushed and thereafter when both of the special key and one of a plurality of general keys are pushed at the same time,
(2) to determine a target position using the received position information of when the special key is pushed and when both of the special key and said one general key are pushed, and
(3) to determine which of the plurality of general keys corresponds to the determined target position.

10. The virtual keyboard of claim 9, wherein the processor is further configured and arranged (4) to output a code corresponding to the combination of the pushed special key and the determined general key.

11. The virtual keyboard of claim 9, wherein to determine the target position the processor is configured and arranged to determine the position of the pushed special key, to determine a furthest returning position using the position information detected and sent in a time sequence when both the special key and the general key are pushed, and to calculate a distance between the special key and the furthest returning position.

12. The virtual keyboard of claim 11, wherein to determine the target position the processor is further configured and arranged to calculate a position using the determined position of the pushed special key and doubling the calculated distance between the special key and furthest returning position.

13. The virtual keyboard of claim 9, wherein the transparent pressure-sensitive panel is of a type where a position in each of the x and y directions is determined using a divided resistance technique.

14. The virtual keyboard of claim 9, wherein the transparent pressure-sensitive panel includes:
a plurality of resistance wires being arranged to extend in a first direction;
a plurality of resistance wires being arranged to extend in a second direction, the first and second directions being at an angle with respect to each other; and
two pairs of electrodes where the plurality of resistance wires in the first direction extend between and are electrically coupled to one of the pair of electrodes and the plurality of resistance wires in the second direction extend between and are electrically coupled to the other of the pair of electrodes.

15. A virtual keyboard comprising:
a display for displaying a keyboard;
a transparent pressure-sensitive panel disposed on the display; and
a processor;
wherein the processor is configured and arranged to:
(1) receive information of positions detected and sent in a time sequence from the pressure sensitive panel, the position information provided including when a special key is first pushed and thereafter when both of the special key and one of a plurality of general keys are pushed at the same time,
(2) determine a target position using the received position information of when the special key is pushed and when both of the special key and said one general key are pushed, including to determine the position of the pushed special key, to determine a furthest returning position using the position information detected and sent in a time sequence when both the special key and the general key are pushed, and to calculate a distance between the special key and the furthest returning position, (3) determine which of the plurality of general keys corresponds to the determined target position, and (4) output a code corresponding to the combination of the pushed special key and the determined general key.

16. The virtual keyboard of claim 15, to determine the target position the processor is further configured and arranged to calculate the target position using the determined position of the pushed special key and doubling the calculated distance between the special key and furthest returning position.

17. The virtual keyboard of claim 16, wherein the detected positions in a time sequence are established using a coordinate system, and wherein the position being calculated is calculated using each of coordinate position(s) of the pushed special key and doubling a calculated distance for each coordinate axis of the coordinate system, the calculated distance being representative of the distance between the special key and the furthest returning position.

18. The virtual keyboard of claim 15, wherein the transparent pressure-sensitive panel is of a type where a position in each of the x and y directions is determined using a divided resistance technique.

19. The virtual keyboard of claim 15, wherein the transparent pressure-sensitive panel includes:

a plurality of resistance wires being arranged to extend in a first direction;

a plurality of resistance wires being arranged to extend in a second direction, the first and second directions being at an angle with respect to each other; and two pairs of electrodes where the plurality of resistance wires in the first direction extend between and are electrically coupled to one of the pair of electrodes and the plurality of resistance wires in the second direction extend between and are electrically coupled to the other of the pair of electrodes.

20. A method for determining one of a plurality of general keys of a virtual keyboard being pushed in combination with a special key being pushed at the same time, comprising the steps of:

pushing the special key;

pushing both of the special key and the one of the plurality of general keys;

releasing both of the special key and one of the plurality of general keys;

detecting positions in a time sequence from a pressure sensitive panel of the virtual keyboard, the detected positions including when the special key is first pushed and thereafter when both of the special key and the one of the plurality of general keys are pushed at the same time, determining a target position using the detected positions of when the special key is pushed and when both of the special key and the one of the plurality of general keys are pushed, and determining which of the plurality of general keys corresponds to the determined target position.

21. The method of claim 20, further including the step of outputting a code corresponding to the combination of the pushed special key and the determined general key.

22. The method of claim 20, wherein said determining the target position includes:

determining a position of the pushed special key when only the special key is being pushed;

determining a furthest returning position using the detected position information when both the special key and the one of the plurality of general keys are pushed at the same time; and calculating a distance between the special key and the furthest returning position.

23. The method of claim 22, wherein said determining the target position further includes calculating a target position using the determined position of the pushed special key and doubling the calculated distance between the special key and furthest returning position.

24. The method of claim 20, wherein each of the positions detected and sent in a time sequence from the pressure-sensitive panel is detected using a divided resistance technique.

25. The virtual keyboard of claim 20, wherein the pressure-sensitive panel includes:

a plurality of resistance wires being arranged to extend in a first direction;

a plurality of resistance wires being arranged to extend in a second direction, the first and second directions being at an angle with respect to each other; and two pairs of electrodes where the plurality of resistance wires in the first direction extend between and are electrically coupled to one of the pair of electrodes and the plurality of resistance wires in the second direction extend between and are electrically coupled to the other of the pair of electrodes.

* * * * *